United States Patent Office 2,778,768
Patented Jan. 22, 1957

2,778,768

PESTICIDAL ETHYLENEBISDITHIOCARBAMATES WITH HYDROXY ETHYL CELLULOSE COMPOSITIONS AND METHODS

George L. Brown, Moorestown, N. J., and Edward A. Nolan, Philadelphia, Pa., assignors to Rohm & Haas Company, Philadelphia, Pa., a corporation of Delaware No Drawing. Application June 19, 1953,
Serial No. 362,974

7 Claims. (Cl. 167—42)

This invention relates to pesticidal compositions. In a specific aspect it concerns compositions containing a salt of ethylenebisdithiocarbamic acid, particularly a soluble salt of said acid, in an aqueous solution having dissolved therein hydroxyethyl cellulose in small amount. These compositions find use in agricultural and horticultural sprays for combatting the attack of plants by fungi and by insects. This invention is also concerned with sprays or spray compositions prepared in water by mixing a soluble ethylenebisdithiocarbamate and a hydroxyethyl cellulose with a soluble polyvalent metal salt and an emulsifiable concentrate of an organic insecticide, particularly a chlorinated insecticide, such as 1,1-bis-(chlorophenyl)-2,2,2-trichloroethane or 1,1-bis(chlorophenyl)-2,2-dichloroethane.

Wide use is now made of salts of ethylenebisdithiocarbamic acid in preventing and combatting attacks of plants by fungi. Aqueous solutions of soluble ethylenebisdithiocarbamates constitute a much used form of these salts. It is a common practice to use such a solution to form an insoluble salt of ethylenebisdithiocarbamic acid in aqueous suspension by mixing a solution of a soluble ethylenebisdithiocarbamate and a solution of a soluble polyvalent metal salt in the tank from which the pesticidal mixture is withdrawn for spraying. When care is taken in mixing the two salts and in mixing them in correct proportions, a finely divided precipitate of an insoluble ethylenebisdithiocarbamate is formed in suspension and in finely divided form which can be readily sprayed onto plant surfaces with uniform deposition of precipitate thereon.

It should be observed that these precipitates protect only against fungi. Yet it is often desired to combine with the above fungicidally active material an insecticidal agent so that a single spray protects against both fungi and insects. Resulting savings in time and labor are obvious.

For use in aqueous sprays there have been developed so-called emulsifiable or emulsion concentrates of such effective insecticides as 1,1-bis(chlorophenyl)-2,2,2-trichloroethane and 1,1 - bis(chlorophenyl) - 2,2 - dichloroethane, the active agent being dissolved in an organic solvent along with a solvent-soluble emulsifier. When the concentrates are added to the tank-mix along with the two salts discussed above, it usually happens that greasy curds form, which interfere with even, uniform distribution of fungicide and insecticide. The curds interfere with the action of spray nozzles and, if screens are used, they sooner or later become clogged. The severity and extent of these difficulties have varied with different lots of materials, temperature of water used, and the character of the water used. While some improvements have been made by varying the solvents and the emulsifiers entering into the concentrates, the problem has persisted. This invention provides a simple and effective solution of this problem.

It has been discovered that a small amount of hydroxyethyl cellulose dissolved in a solution of a salt of ethylenebisdithiocarbamic acid permits the precipitation of an insoluble polyvalent metal ethylenebisdithiocarbamate and addition of emulsifiable concentrate without formation of waxy or greasy curds and with retention of the potent fungicidal and insecticidal actions of the several toxicants. It has been further found that the action of hydroxyethyl cellulose is quite specific. Other cellulose derivatives, such as methyl cellulose and sodium carboxymethyl cellulose, are not efficient or are ineffective, as are various gums and proteins. Likewise, many synthetic surfactants sometimes suggested as possible dispersants are ineffective, as well as agents which are recommended purely for dispersing action. Some agents improve the dispersion of insecticide but cause floccing of the precipitated ethylenebisdithiocarbamate. Others have no effect and some even promote curding.

As soluble salts of ethylenebisdithiocarbamic acid there may be used the alkali metal salts or the magnesium or calcium salts. The commonly available salt is that of sodium in a concentration from 17% to about 30% of disodium ethylenebisdithiocarbamate. In general solutions are prepared containing from about 15% soluble salt up to saturation.

Any of these solutions is conveniently modified by addition thereto of a soluble hydroxyethyl cellulose in an amount of 0.4% to 3.5% on the weight of the soluble ethylenebisdithiocarbamate (calculated on an anhydrous basis) and preferably 1% to 2.3%.

Hydroxyethyl cellulose is available in two types, one soluble directly in water and one soluble in water with the aid of sodium hydroxide. In the first there is a higher degree of hydroxyethylation than in the latter. Thus, with introduction of between 0.5 and 1 to about 1.5 hydroxyethyl group per glucose unit water solubility is attained, depending on the degree of polymerization, while with 0.2 to 0.5 or more hydroxyethyl groups per glucose unit caustic is needed to ensure solubility at ordinary temperatures. Either type may be used with satisfactory results. When alkali-soluble hydroxyethyl cellulose is used, however, there should also be used for best results a small amount of a condensed naphthalene sulfonate or of a lignosulfonate. The water-soluble type of hydroxyethyl cellulose does not require such additive.

The condensed naphthalene sulfonates are formed, for example, by reacting naphthalene and sulfuric acid, as by heating a mixture of equal weights of the two, cooling the reaction mixture, diluting it with water, reacting it with formaldehyde, and heating this reaction mixture until a product of good dispersing activity results. The product is then treated with an alkali metal base to give a salt.

Sulfonated lignins are available which are suitable as dispersants. As is known, they are obtained as by-products in paper manufacture by the sulfite process. In one form the more active portion is concentrated as water-soluble salts, usually as sodium lignosulfonates. In another form the basic calcium lignosulfonates are heated with caustic soda while air is passed through, insoluble lime salts are removed, and the active materials are precipitated with acid, separated, and redissolved with caustic to give the so-called partially desulfonated lignosulfonates.

There may be used from 0.1% to 2.5% of one of these sulfonates, based on the weight of the ethylenebisdithiocarbamate used. The optimum amount will depend primarily upon the particular hydroxyethyl cellulose used, more being used as relatively more sodium hydroxide is required to dissolve the hydroxyethyl cellulose in water, less with those hydroxyethyl celluloses requiring but little caustic for solution, and none with hydroxyethyl celluloses which are soluble in water at normal temperatures.

It will be recalled that soluble ethylenebisdithiocarbamates are prepared by reacting together carbon bisulfide, ethylenediamine, and a soluble base, such as sodium or potassium hydroxide. The exact order in which these materials are mixed or combined is not critical, although some orders are more convenient than others and lead to higher concentrations of aqueous solutions of the ethylenebisdithiocarbamates, these solutions being preferred for shipping and handling and also being more stable than dilute solutions.

To prepare the primary compositions of this invention there is added to a solution of one or more of the water-soluble ethylenebisdithiocarbamates a hydroxyethyl cellulose, best in the form of an aqueous solution. If the particular hydroxyethyl cellulose requires caustic for its solution in water, there should also be used a soluble sulfonated lignin or a naphthalene-formaldehyde sulfonate. The most useful proportions of these additives have been shown above. The compositions containing soluble ethylenebisdithiocarbamate and hydroxyethyl cellulose may be stored and shipped and is ready for use either on proper dilution, on combination with a polyvalent metal salt, or on combination with a metal salt and an emulsifiable concentrate of an insecticide. The composition may also be mixed with a solution of polyvalent metal salt to form a precipitate, which is dried and used as a powdered solid. These powdered solids overcome or prevent the curding effects of the ethylenebisdithiocarbamates on emulsion concentrates.

When the above composition is to be used in conjunction with a polyvalent metal salt, it may be added directly to a solution of the said salt or, when highly insoluble polyvalent metal salts of ethylenebisdithiocarbamic acid are to be formed, the above composition may be first diluted, even with the full amount of water to be used in the mixture for spraying. In the latter case the polyvalent metal salt may be previously dissolved in the full amount of water or a solution of said salt may be added to the diluted ethylenebisdithiocarbamate.

The amount of an ethylenebisdithiocarbamate which is ordinarily used is about 0.8 pound per 100 gallons of spray. In the usual type of spray this amount may vary from about 0.4 pound to about 1.2 pounds per 100 gallons. Where concentrated sprays are used and the volume of spray can, therefore, be reduced on an acreage basis, concentrations may be four to eight times those used in the ordinary sprays. The above amounts are based primarily upon the weight of sodium ethylenebisdithiocarbamate, which is the most commonly used soluble salt. Translation to weights of other salts requires little if any variation in these figures.

As polyvalent metal salts for forming insoluble ethylenebisdithiocarbamates, there may be used water-soluble chlorides, bromides, sulfates, nitrates, acetates or the like of such metals as zinc, cadmium, nickel, cobalt, iron, manganese, chromium, bismuth, lead, mercury, aluminum, barium, or copper, or mixtures of such salts. There may thus be used such salts as zinc chloride, zinc sulfate, zinc nitrate, cadmium chloride, copper sulfate, copper nitrate, nickel chloride, cobalt chloride, manganous chloride, manganese sulfate, lead nitrate, mercury acetate, barium chloride, ferrous or ferric chloride or sulfate. Compatible mixtures of salts may also be used. Silver nitrate, although not a polyvalent metal salt, may be used in the same way. The amount of such salt used is about equivalent to the soluble ethylenebisdithiocarbamate used.

The dilute suspensions of insoluble polyvalent metal salts of ethylenebisdithiocarbamic acid, prepared, for instance, by one of the ways described above, may be applied to foliage to combat fungi with excellent results, as far as control of fungal diseases is concerned. Wetting and/or sticking agents may be used in the spray mix, if so desired. But for full efficiency in many situations the spray mix should contain an insecticide in addition to the fungicide.

This is readily and effectively accomplished by adding to the above spray composition an emulsifiable concentrate of an organic insecticide. No agglomerates or curds are formed. The spray mix passes through screens and nozzles without the clogging otherwise experienced. The spray can be uniformly and effectively applied to the areas to be protected.

Emulsifiable concentrates most frequently used with the ethylenebisdithiocarbamates are based on 1,1-bis(chlorophenyl)-2,2,2-trichloroethane and on 1,1-bis(chlorophenyl)-2,2-dichloroethane. Also used in the form of emulsifiable concentrates are toxaphene, chlordane, aldrin, dieldrin, γ-hexachlorocyclohexane in its various states of purities, heptachlor, and parathion. These are available in the form of solutions in xylene or other aromatic solvents, including methylated naphthalenes, usually at concentrations of 25% to 75% of toxicant. The concentrates include 2% to 10% of one or more solvent-soluble emulsifiers, such as a non-ionic surfactant. Typical of these are the water-soluble adducts of ethylene oxide and long chained alkylphenols, alcohols, mercaptans, and fatty acids. Other emulsifiers may be used alone or in admixture with a non-ionic emulsifier.

Some typical formulae for emulsifier concentrates are as follows: A, 45 parts of toxaphene, 3 parts of non-ionic emulsifier, and 52 parts of xylene or other aromatic solvent; B, 30.2 parts of 36% gamma benzenehexachloride, 4 parts of non-ionic emulsifier, and 65.8 parts of xylene or other aromatic solvent; C, 25 parts of 1,1-bis(chlorophenyl)-2,2-dichloroethane, 3 parts of non-ionic emulsifier, and 72 parts of methylated naphthalenes; D, 25 parts of methoxychlor, 5 parts of non-ionic emulsifier, and 70 parts of aromatic naphtha; E, 41 parts of 60% aldrin equivalent solution, 4 parts of non-ionic emulsifier, and 55 parts of kerosene or kerosene and xylene; F, 32.8 parts of heptachlor, 4 parts of non-ionic emulsifiers, and 63.2 parts of aromatic naphtha; G, 62 parts of chlordane, 4 parts of non-ionic emulsifiers, and 34 parts of kerosene.

Sometimes several toxicants are compounded. For example, there may be mixed together 20 parts of bis(chlorophenyl)trichloroethane, 39 parts of toxaphene, 4 parts of non-ionic emulsifiers, and 37 parts of xylene. Another typical formula consists of 25 parts of 36% gamma benzenehexachloride, 15 parts of DDT, 4 parts of oil soluble emulsifier, and 56 parts of xylene or other aromatic solvent.

The emulsion concentrates are added to the suspension formed from the water-soluble ethylenebisdithiocarbamate and polyvalent metal salt, hydroxyethyl cellulose being present. The concentrate is used in the conventional amounts recommended for dilution of a particular toxicant. Dilution will depend upon the particular toxicant, its concentration, the particular pest to be combatted, and the conditions of application. In general the emulsifiable concentrates are diluted to give concentrations from 0.1% to 10% in the spray.

Some typical formulations follow. Parts are by weight.

*Example 1*

A solution is prepared by conventional reaction of carbon bisulfide, ethylenediamine, and caustic soda in water. It contains 22.5% of $NaS_2CNHC_2H_4NHCS_2Na$ and has a pH of 9. To 1000 parts by weight of this solution there is added a solution of five parts of hydroxyethyl cellulose which has been taken up in 50 parts of water. This hydroxyethyl cellulose has a viscosity of about 1000 cps. in 5% solution and contains about 1.4 hydroxyethyl groups per glucose unit. When the resulting composition is treated with polyvalent metal salts and emulsifiable concentrates, no curds or greasy materials form.

The beneficial effect of the above composition may be demonstrated in small scale practical tests which closely simulate field conditions. To one gallon of water there is added a 22 gram portion of the above solution and a solution of 3.4 grams of commercial zinc sulfate taken up in a minimum of water. To this mixture is added a 20 gram portion of a commercial 25% DDT emulsion concentrate. The mixture is well stirred and then allowed to stand a half hour. It is then passed through a 48-mesh screen. There is no material retained by the screen.

Parallel with the above test a control test is made with the original solution of disodium ethylenebisdithiocarbamate. An equivalent portion of this solution is diluted in a gallon of water in which 3.4 grams of the commercial zinc sulfate has been dissolved. There is then added a 20 gram portion of the same 25% DDT emulsifiable concentrate. The mixture is well stirred, allowed to stand a half hour, and passed through a 48-mesh screen. There is retained by the screen a greasy material which amounts to 12 ml.

Example 2

Another lot of a 24% disodium ethylenebisdithiocarbamate solution is taken and a 1000 part portion is treated with a concentrated solution of three grams of water-soluble hydroxyethyl cellulose. This cellulose ether gives a viscosity of about 1100 cps. in 5% solution.

This solution is evaluated by the test method described in Example 1. There is no grease collected on the 48-mesh screen.

A similar control test with the starting solution of disodium ethylenebisdithiocarbamate deposits 15 ml. of waxy material on the screen.

Example 3

There is taken a 1000 part portion of the above 24% solution of disodium ethylenebisdithiocarbamate. There is prepared a solution of 2 parts by weight of alkali soluble hydroxyethyl cellulose which has been taken up in a minimum amount of sodium hydroxide solution. This cellulose ether imparts a viscosity of 4600 cps. to a 5% solution thereof and has a degree of substitution of 0.2 to 0.3. There is also added a solution of 5 parts of naphthalene-formaldehyde sodium sulfonate in almost saturated solution. The mixture is stirred to ensure homogeneity.

This composition is evaluated by the test method described above. When the spray mix made with the DDT emulsion concentrate is passed through the screen, there is no grease or waxy material retained on the screen.

The amount of waxy material which is collected from control samples of different lots of disodium ethylenebisdithiocarbamate has been found to be as much as 50 ml. In every case, however, the formation of such material is prevented by adding to the various solutions of the ethylenebisdithiocarbamate an amount of hydroxyethyl cellulose from 0.1 to 0.8% of the weight of this solution, these solutions containing 17% to 30% of the disodium salt calculated on a dry basis.

Example 4

(a) A mixture of 209 parts of carbon bisulfide and 425 parts of a potassium hydroxide solution (containing 165 parts of 85% potassium hydroxide) is stirred and cooled while 108 parts of 69.3% ethylenediamine is slowly added, the temperature of the mixture being held below 35° C. The reaction mixture is stirred for six hours. The solution is evaporated under reduced pressure to give 354 parts of dipotassium ethylenebisdithiocarbamate.

(b) A portion of 5.25 grams of this salt is dissolved in about 20 grams of water and added to one gallon of water in which 3.4 grams of zinc sulfate has been dissolved. There is then added a 20 gram portion of a 25% DDT emulsifiable concentrate. The mixture is stirred and passed through a 48-mesh screen. There is separated a greasy mass of about 10 ml.

(c) A portion of 100 parts of the dipotassium ethylenebisdithiocarbamate is dissolved in 400 parts of water in which five parts of a sodium lignosulfonate and two parts of hydroxyethyl cellulose have been dissolved with the aid of a little sodium hydroxide solution. The resulting composition is useful in preparing horticultural and agricultural sprays.

When tested in the same way as shown in (b), there is no formation of curds or agglomerates.

(d) A portion of 5.3 grams of the above potassium salt is dissolved in about 20 grams of water. There is also prepared a solution of three grams of manganese sulfate in about 25 grams of water. The two solutions are mixed with formation of a precipitate. The mixture is then stirred into one gallon of water. A portion of 20 grams of a 25% DDT emulsifiable concentrate is added and the mixture is stirred. It is passed through a 48-mesh screen with separation on the screen of 16 ml. of greasy curds.

(e) A portion of 100 parts of the above potassium salt is dissolved in 400 grams of water. A solution is prepared from 56 parts of manganese sulfate in 500 parts of water. The two solutions are mixed and the mixture is treated with a viscous solution of four parts of water-soluble hydroxyethyl cellulose in a minimum of water. The resulting composition is thoroughly stirred.

A portion of 45 ml. of this suspension is added to a gallon of water along with 20 grams of 25% DDT emulsifiable concentrate. The resulting dispersion is free of agglomerates or grease.

(f) A solution is made of six grams of barium chloride in a gallon of water and thereto is added a 25 ml. portion of the composition prepared in (c). To this mixture is added a portion of 20 grams of 25% DDT emulsifiable concentrate. The mixture is stirred, allowed to stand for a half hour and passed through a test screen. No curds or agglomerates are obtained.

Without the presence of hydroxyethyl cellulose, however, greasy curds are collected in an amount of 10 to 12 ml.

Example 5

A 1000 part portion from a batch of an aqueous 21% disodium ethylenebisdithiocarbamate solution is taken and treated with 50 parts of an aqueous solution containing five parts of water-soluble hydroxyethyl cellulose.

A ten gram portion of this solution is added to a gallon of water in which 14 parts of ferric sulfate has been dissolved. To this is added a 20 gram portion of an emulsion concentrate containing 25% of 1,1-bis(chlorophenyl)-2,2-dichloroethane. The mixture is stirred and allowed to stand a half hour. It is then passed through a 48-mesh screen. There are no curds or greasy materials retained by the screen. Without the use of hydroxyethyl cellulose about 10 ml. of curds result.

In the same way other polyvalent salts may be used in the place of barium, iron, manganese, or zinc salts used above. Other emulsifiable concentrates may be used in the same way. Whenever the compositions contain hydroxyethyl cellulose, curds and greasy agglomerates are avoided.

We claim:

1. A pesticidal composition which comprises an aqueous solution containing 17% to 30% of disodium ethylenebisdithiocarbamic acid, between 0.4% and 3.5% of the weight thereof of an alkali-soluble, water-insoluble hydroxyethyl cellulose, dissolved with the aid of sodium hydroxide, and between 0.1% and 2.5% of the weight of said ethylenebisdithiocarbamate of a compound from the class consisting of condensed naphthalene-formaldehyde sodium sulfonate and sodium lignosulfonates.

2. A pesticidal composition which comprises an aqueout alkaline dispersion of a water-insoluble polyvalent metal salt of ethylenebisdithiocarbamic acid, together with a dissolved alkali-soluble, water-insoluble hydroxyethyl cellulose in an amount of about 0.4% to 3.5% of the weight of the said metal salt and with a compound from the class consisting of condensed naphthalene-formaldehyde sodium sulfonate and sodium lignosulfonates in an amount of 0.1% to 2.5% of the weight of said metal salt, and of an emulsion concentrate of a chlorinated insecticidal toxicant which has been dissolved in hydrocarbon solvent along with a non-ionic emulsifier.

3. The composition of claim 2 wherein the toxicant is 1,1-bis(chlorophenyl)-2,2,2-trichloroethane.

4. The composition of claim 2 wherein the toxicant is 1,1-bis(chlorophenyl)-2,2-dichloroethane.

5. A process for preparing non-greasing spray compositions which comprises forming an aqueous alkaline solution containing disodium ethylenebisdithiocarbamate, a dissolved alkali-soluble water-insoluble hydroxyethyl cellulose in an amount of 0.4% to 3.5% of the weight of the sodium ethylenedithiocarbamate, and a compound from the class consisting of condensed naphthalene-formaldehyde sodium sulfonate and sodium lignosulfonates in an amount of 0.1% to 2.5% of the weight of said sodium ethylenedithiocarbamate, mixing said solution with an aqueous solution of a polyvalent metal salt giving a water-insoluble ethylenebisdithiocarbamate, whereby an aqueous suspension of a polyvalent metal ethylenebisdithiocarbamate is formed, and dispersing in said suspension an insecticidal toxicant from an emulsion concentrate thereof in a hydrocarbon solvent with emulsifier.

6. The process of claim 5 wherein the toxicant is 1,1-bis(chlorophenyl)-2,2,2-trichloroethane.

7. The process of claim 5 wherein the polyvalent metal is zinc.

References Cited in the file of this patent

UNITED STATES PATENTS

| | | |
|---|---|---|
| 2,317,765 | Hester | Apr. 27, 1943 |
| 2,369,429 | Boissonou | Feb. 13, 1945 |
| 2,508,342 | Wilson | May 16, 1950 |
| 2,521,318 | Wohlers | Sept. 5, 1950 |
| 2,545,948 | Flenner | Mar. 20, 1951 |
| 2,662,841 | Fike et al. | Dec. 15, 1953 |

FOREIGN PATENTS

| | | |
|---|---|---|
| 671,996 | Great Britain | 1952 |
| 226,792 | Switzerland | July 16, 1943 |
| 63,880 | Denmark | Aug. 27, 1945 |